United States Patent
Harris et al.

(10) Patent No.: US 6,980,818 B2
(45) Date of Patent: Dec. 27, 2005

(54) METHOD FOR SIGNALING BASED ON PAGING CHANNEL LOADING

(75) Inventors: John M. Harris, Chicago, IL (US); Ronald T. Crocker, St. Charles, IL (US); Sean S. Kelley, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 56 days.

(21) Appl. No.: 10/614,838

(22) Filed: Jul. 8, 2003

(65) Prior Publication Data
US 2005/0009534 A1    Jan. 13, 2005

(51) Int. Cl.$^7$ .............................................. H04Q 7/20

(52) U.S. Cl. ....................... 455/466; 455/453; 455/458

(58) Field of Search ................................ 455/453, 466, 455/458–460, 432.1, 434, 446, 450, 449, 455/436, 422.1, 456.1, 513, 509, 63.2, 515; 370/237, 232, 329, 341, 432, 312–314; 340/7.22, 340/7.23, 7.1, 7.21, 7.28, 7.2

(56) References Cited

U.S. PATENT DOCUMENTS

| | | | |
|---|---|---|---|
| 5,822,700 A | * | 10/1998 | Hult et al. ................... 455/466 |
| 5,907,810 A | | 5/1999 | Subramanian et al. |
| 5,966,662 A | * | 10/1999 | Murto ......................... 455/458 |
| 6,035,203 A | | 3/2000 | Hanson |
| 6,424,835 B1 | | 7/2002 | Shin |
| 6,822,973 B2 | | 11/2004 | Kelley et al. |
| 2003/0148785 A1 | * | 8/2003 | Mangal et al. .............. 455/552 |

* cited by examiner

Primary Examiner—Eliseo Ramos-Feliciano
(74) Attorney, Agent, or Firm—Jeffrey K. Jacobs

(57) ABSTRACT

The need to reduce the cost associated with signaling mobiles (120) across multiple cells (101–108) is addressed by embodiments of the present invention. A targeted MS is initially paged only in those cells in which the paging channel loading level is below a particular paging threshold. Similarly for short messaging, the RAN transmits the short messaging to the MS only in those cells in which the paging channel loading level is below a short messaging threshold. Therefore, the MS can be signaled in under-loaded cells first, were the effect on system capacity and performance is negligible. When successful, the MS signaling is achieved at a lower cost to the system than when loaded cells are involved.

30 Claims, 3 Drawing Sheets

METHOD FOR SIGNALING BASED ON PAGING CHANNEL LOADING

REFERENCE(S) TO RELATED APPLICATION(S)

This application is related to a co-pending application entitled "METHOD AND APPARATUS FOR REDUCING PAGING-RELATED DELAYS," having application Ser. No. 10/614,942, filed on Jul. 8, 2003, and assigned to the assignee of the present application.

This application is related to a co-pending application entitled "METHOD AND APPARATUS FOR REDUCING PAGING-RELATED DELAYS FOR ANTICIPATED TARGET MOBILE STATIONS," having application Ser. No. 10/614,839, filed on Jul. 8, 2003, and assigned to the assignee of the present application.

This application is related to a co-pending application, Ser. No. 10/303,255, entitled "METHOD FOR EXPEDITING TRANSITIONS BETWEEN STATES OF OPERATION IN COMMUNICATIONS EQUIPMENT," filed Nov. 25, 2002, which is assigned to the assignee of the present application.

This application Is related to a co-pending application, Ser. No. 10/701,095, entitled "APPARATUS AND METHOD FOR PERFORMING RADIO ENVIRONMENT REPORTING ON A REVERSE COMMON SIGNALING CHANNEL," filed Nov. 4, 2003, which is assigned to the assignee of the present application.

This application is related to a co-pending application, Ser. No. 10/323,428, entitled "CALL SETUP FOR A MOBILE PACKET DATA DISPATCH NETWORK," filed Dec. 18, 2002, which is assigned to the assignee of the present application.

This application is related to a co-pending application, Ser. No. 10/349,728, entitled "A DISPATCH CALL SETUP METHOD," filed Jan. 22, 2003, which is assigned to the assignee of the present application.

This application is related to a co-pending application, Ser. No. 09/467,571, entitled "METHOD AND APPARATUS FOR CALL SETUP IN A WIRELESS COMMUNICATION SYSTEM," filed Dec. 20, 1999, which is assigned to the assignee of the present application.

FIELD OF THE INVENTION

The present invention relates generally to wireless communication systems and, in particular, to mobile station (MS) signaling based on forward common channel loading.

BACKGROUND OF THE INVENTION

In today's wireless communication systems, mobile units that are inactive/idle/dormant with respect to the radio access network (RAN) often need to be located before receiving network services. Typically, the targeted mobile will be paged and its location deduced from its page response. However, paging a mobile can involve transmitting pages in all the cells of the mobile's location area or paging zone. This practice, and its known variations, can contribute to overloading the paging channels of already congested cells. Moreover, this problem is amplified by signaling such as as short message service (SMS) signaling, which involves messaging substantially larger than pages. Thus, a need exists for an apparatus and method that reduces the cost associated with signaling mobiles across multiple cells.

DETAILED DESCRIPTION OF EMBODIMENTS

The need to reduce the cost associated with signaling mobiles across multiple cells is addressed by embodiments of the present invention. A targeted MS is initially paged only in those cells in which the paging channel loading level is below a particular paging threshold. Similarly for short messaging, the RAN transmits the short messaging to the MS only in those cells in which the paging channel loading level is below a short messaging threshold. Therefore, the MS can be signaled in under-loaded cells first, where the effect on system capacity and performance is negligible. When successful, the MS signaling is achieved at a lower cost to the system than when loaded cells are involved.

Figure 1:
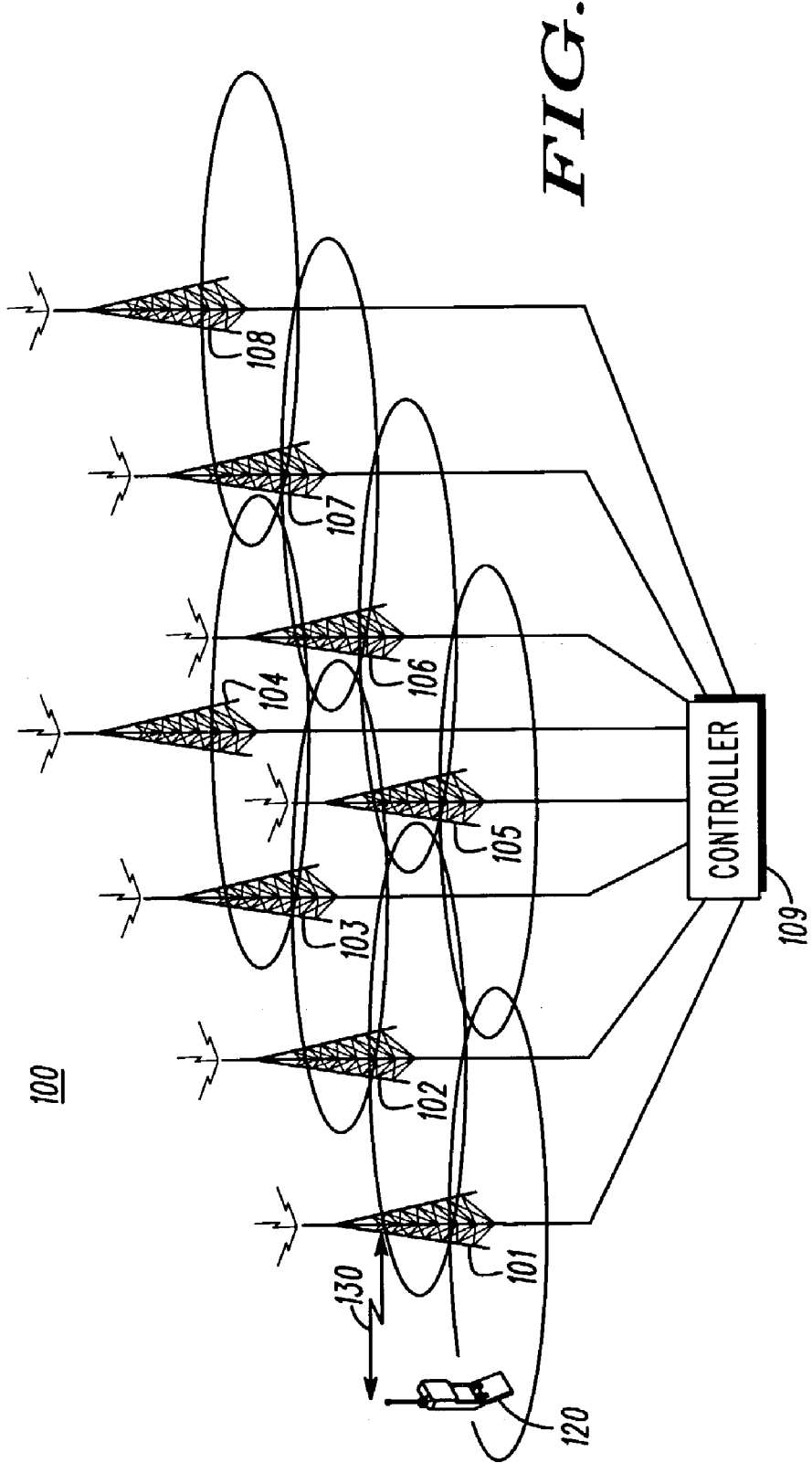
FIG. 1 is a depiction of a communication system in accordance with embodiments of the present invention.
Figure 2:
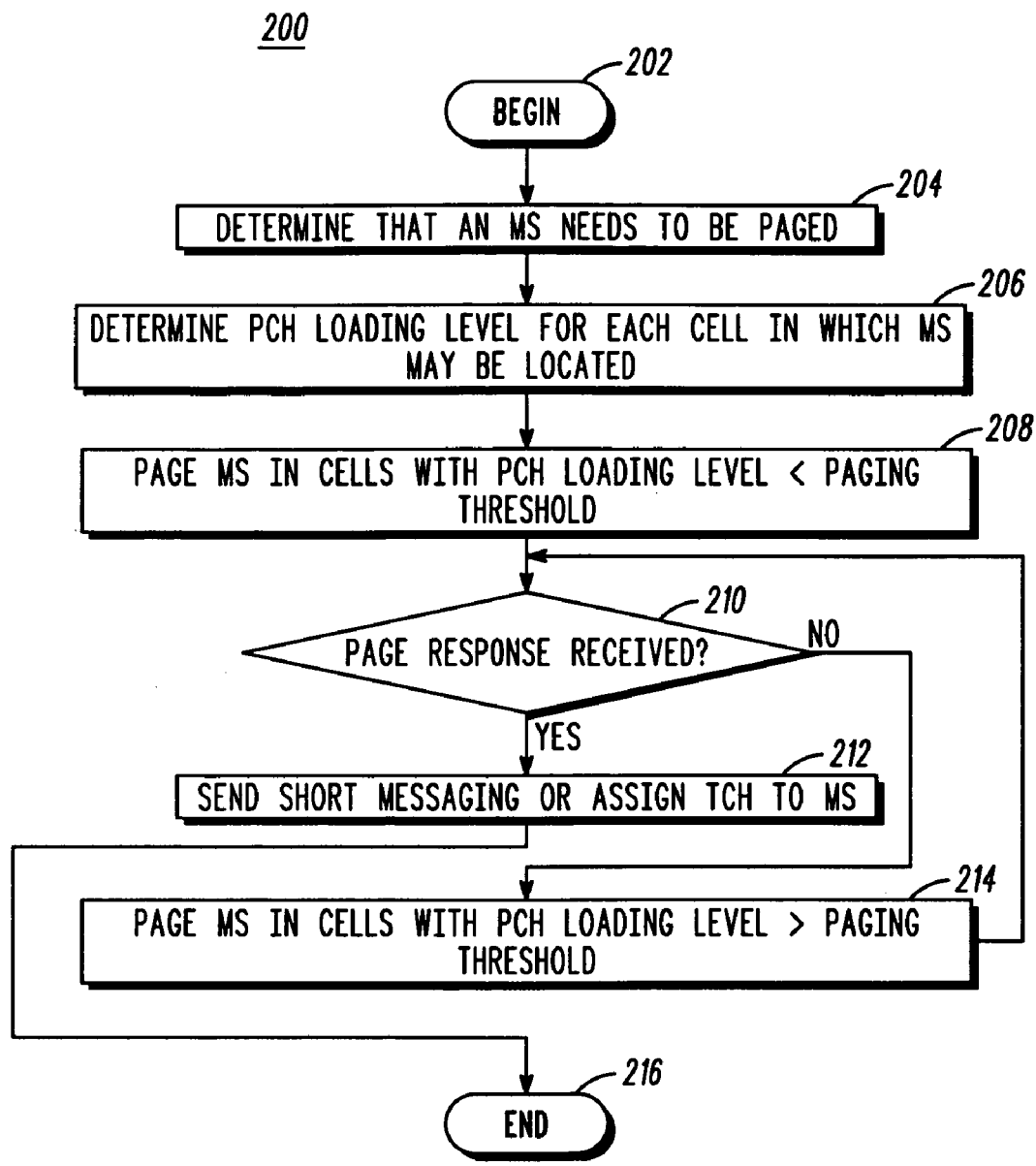
FIG. 2 is a logic flow diagram of functionality performed by a RAN in accordance with a first embodiment of the present invention.
Figure 3:
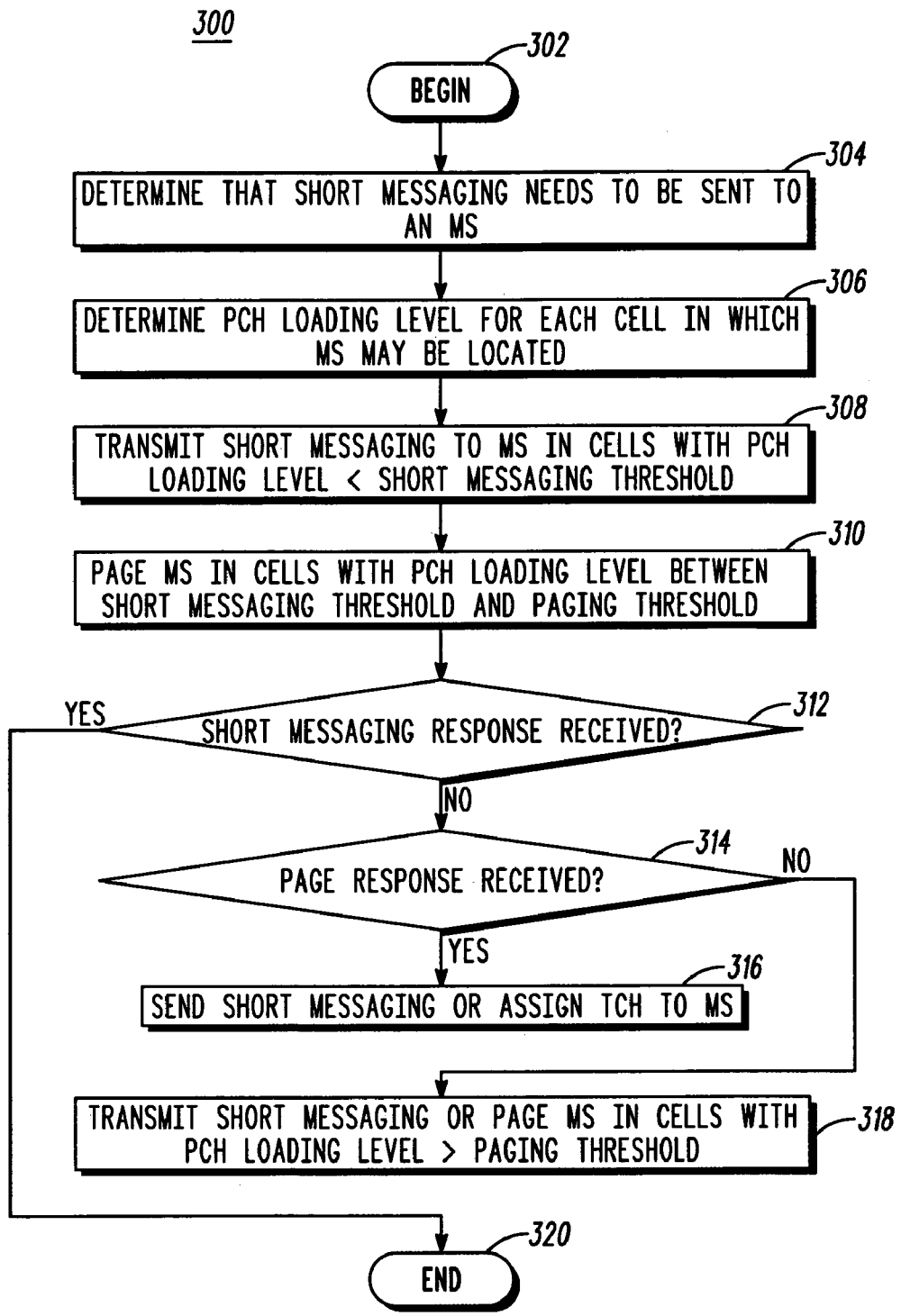
FIG. 3 is a logic flow diagram of functionality performed by a RAN in accordance with a second embodiment of the present invention.

The disclosed embodiments can be more fully understood with reference to FIGS. 1–3. FIG. 1 is a depiction of communication system 100 in accordance with embodiments of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Washington, D.C. 20006). Alternative embodiments of the present invention may be implemented in communication systems that employ other technologies such as, but not limited to, 1×, EVDV, UMTS, HRPD (IS-856), WLAN WCDMA, "iDEN," "WiDEN," GSM, GPRS, and EDGE.

Referring to FIG. 1, communication system 100 includes radio access network (RAN) (equipment 101–109) and mobile station (MS) 120. Although depicted as a mobile phone, MSs in the present invention are not limited to mobile phones. For example, an MS may comprise all manner of devices wirelessly connected to the RAN such as computers, personal data assistants (PDAs), gaming devices, etc.

Those skilled in the art will recognize that FIG. 1 does not depict all of the network equipment necessary for system 100 to operate but only those system components and logical entities particularly relevant to the description of embodiments of the present invention. For example, the RAN comprises well-known components such as wireless transceiver equipment 101–108 supporting signaling transmission and reception for each cell, i.e., wireless coverage area. Since a wireless coverage area may refer to a cell or a sector of a cell, depending on the particular implementation, the term "cell" (or "cell-site") will be understood by those skilled in the art to refer to an individual sector within those cells that contain multiple sectors. The RAN of system 100 also comprises communications controller 109. Those skilled in the art are aware of the many ways each of these entities can be implemented and/or purchased from wireless communications companies such as "MOTOROLA." Controllers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement a controller that performs the given logic.

In some embodiments of the present invention, RAN wireless transceiver equipment is included within components such as RAN base transceiver stations (BTSs), while RAN communications controllers are implemented in a distributed fashion across components that include base site controllers (BSCs) and the BTSs, Although not shown, BSCs are known to interface with other RAN equipment such as mobile switching centers/virtual location registers (MSC/VLR), home location registers (HLR), etc. In a first and second embodiment of the present invention, a known CDMA 2000 RAN, is adapted using known telecommunications design and development techniques to implement the RAN aspect of the present invention. The result is the RAN of system 100, which performs the methods described with respect to FIGS. 2 and 3. Those skilled in the art will recognize that the RAN aspect of the present invention may be implemented in and across various physical components of system 100, including those not illustrated in FIG. 1.

The RAN of system 100 communicates with MS 120 via CDMA 2000 air interface resource 130. Resource 130 comprises a variety of well-known channel types, such as access channels, paging channels, and traffic channels. Some of these channels, such as traffic channels, are dynamically assigned and de-assigned to provide user services as requested and according to well-known techniques and standards.

Operation of communication system 100 in accordance with the first embodiment of the present invention occurs substantially as follows. In the first embodiment, controller 109 determines during its operation that MS 120 needs to be paged. There are many well-known triggering events that may lead controller 109 to this determination. For example, another communication device may have initiated a service targeting MS 120 and controller 109 determines that MS 120 needs to be located and assigned a traffic channel (TCH). In another example, controller 109 may have received data for delivery to MS 120 via a Smart Short Message Service (Smart SMS), which requires controller 109 to locate MS 120 before sending the SMS.

Controller 109 then determines a paging channel loading level for each cell in which MS 120 may be located, i.e., each cell selected for paging by the particular paging algorithm used. For example, the group of cells in which MS 120 may be located may simply be the paging zone of MS 120. That is, the paging zone that controller 109 believes MS 120 is within. Controller 109 then pages MS 120 via the wireless transceiver equipment of those cells in which the paging channel loading level is below a paging threshold. For purposes of illustration, wireless transceiver equipment 104–108 will be considered to have paging channel loading levels below the paging threshold. Thus, MS 120 is paged by controller 109 via wireless transceiver equipment 104–108 but not by transceiver equipment 101–103.

Defining how the paging channel loading level will represent the actual paging channel loading of a cell and accordingly, setting an effective paging threshold can be done in a variety of ways by system designers. In one embodiment of the present invention, the paging channel loading level may, for example, be the percentage of paging channel capacity currently being used in the cell or a moving average thereof, while the paging threshold could then be set to a value such as 90% or tuned to achieve optimal system performance for a given system.

Had MS 120 been in a cell supported by transceiver equipment 104–108 it likely would have received controller 109's page and responded by transmitting a page response. Receiving this page response via the transceiver equipment of a particular cell, controller 109 could then proceed with providing whatever communication services triggered the page. Having located MS 120, controller 109 can target these services to the cell in which MS 120 responded.

For example, controller 109 may have short messaging to deliver to MS 120, such as a data packet, data burst messaging (e.g., short message service (SMS) messaging and short data burst (SDB) messaging), or notification messaging (e.g., email notification messaging, voice mail notification messaging, and presence notification messaging). Alternatively, controller 109 may send channel assignment messaging to assign a traffic channel to the MS. The traffic channel may be needed to support a voice call or data session, for example. However, for voice call setup, embodiments of the present invention may increase the delay experienced by a calling user. Thus, in the first embodiment load-based paging is used for voice call setup when the target MS (or MSs) has a slot cycle index less than a value corresponding to the maximum tolerable slot cycle delay, typically two. This practice can ensure call setup delays that result when the MS is not in the first group of cells paged is within a tolerable limit. Similarly, for data call setup, embodiments of the present invention are used when any additional delay that could result is within a tolerable limit, such as for delay tolerant data which may be determined by service option or teleservice type field.

Since MS 120 is not in a cell supported by transceiver equipment 104–108, it did not receive a page and thus did not send any response. Having not received any page response via transceiver equipment 104–108 (perhaps, even after repeated paging), controller 109 then pages the MS in at least one of those cells in which the paging channel loading level is above the paging threshold. For example, controller 109 may page MS 120 in the remaining cells, i.e., via transceiver equipment 101–103. Alternatively, controller 109 could incrementally increase the paging threshold and thus gradually page the MS in more and more loaded cells until a page response is received.

Once a page response is received, controller 109 can then proceed with providing whatever communication services triggered the page, as described above. When the paging channel of a cell is at or near an overloaded condition, the controller may assign a traffic channel to a target MS and then send messaging that would otherwise be sent over the paging channel over the traffic channel instead. This could be done for SMS messages, for example. If such messaging is sent over the paging channel, despite its loaded condition, the controller may send the messaging without one or more of its optional fields in order to limit the impact to the paging channel. For example, a subject header or "from who" information may be stripped from an email notification sent over the loaded paging channel.

In a second embodiment of the present invention, controller 109 determines that short messaging needs to be sent to MS 120. As in the first embodiment, controller 109 determines a paging channel loading level for each cell in which the MS may be located. Similar to the first embodiment, controller 109 then transmits the short messaging to MS 120 only in those cells in which the paging channel loading level is below a short messaging threshold. Similar to the paging threshold discussed above, the short messaging threshold should be somewhat lower than the paging threshold (perhaps 75%) due to the larger size of the messaging.

In the second embodiment, controller 109 pages MS 120, rather than transmitting the short messaging, in those cells in which the paging channel loading level is above the short messaging threshold but below a paging threshold. The paging thresholds of the first and second embodiments are the same; however, they need not be. Alternatively, instead of paging in these cells in which the paging channel loading level is above the short messaging threshold but below the paging threshold, controller 109 may simply wait for a short messaging response. When none is received, controller 109 may begin transmitting the short messaging in at least one of those cells in which the paging channel loading level is above the short messaging threshold.

If MS 120 were in a cell in which it received a page (rather than the short messaging), controller 109 would receive MS 120's page response and then send the short messaging to MS 120 in that cell. Alternatively, controller 109 may send channel assignment messaging to assign a traffic channel to the MS and then send the short messaging via the traffic channel, as described above.

Since MS 120 is not in a cell supported by transceiver equipment 104–108, it did not receive the short messaging or a page and thus did not send any response. Having not received any response via transceiver equipment 104–108 (perhaps, even after repeated transmissions), controller 109 then pages the MS in at least one of those cells in which the paging channel loading level is above the paging threshold. For example, controller 109 may page MS 120 in the remaining cells, i.e., via transceiver equipment 101–103. Alternatively, controller 109 could incrementally increase the paging threshold and thus gradually page the MS in more and more loaded cells until a page response is received.

After receiving MS 120's page response from transceiver equipment 101, controller 109 then sends the short messaging to MS 120 via transceiver equipment 101. In an alternative embodiment, instead of paging MS 120 in cells in which the paging channel loading level is above the paging threshold, controller 109 may send the short messaging in one or more of these cells, perhaps incrementally, until a response is received.

FIG. 2 is a logic flow diagram of functionality performed by a RAN in accordance with the first embodiment of the present invention. Logic flow 200 begins (202) when the RAN determines (204) that an MS needs to be paged, and optionally determines that the service triggering the page is tolerant to increased delay that might occur. The RAN determines (206) a paging channel loading level for each cell in which the MS may be located and pages (208) the MS in those cells in which the loading level is less than a paging threshold. If (210) the MS does not respond to the paging, the RAN proceeds to page (214) the MS in the cells with paging channel loading levels above the paging threshold. When a page response is received (whether initially or not) from the MS, then the RAN proceeds by providing, to the MS in the cell in which (the MS responded, whatever communication service(s) required the paging. This may entail assigning (212) a traffic channel or sending short messaging to the MS. Logic flow 200 thus ends (216).

FIG. 3 is a logic flow diagram of functionality performed by a RAN in accordance with the second embodiment of the present invention. Logic flow 300 begins (302) when the RAN determines (304) that short messaging needs to be sent to an MS, and optionally determines that the service triggering the page is tolerant to increased delay that might occur. The RAN determines (306) a paging channel loading level for each cell in which the MS may be located. The RAN then transmits (308) the short messaging in those cells in which the loading level is less than a short messaging threshold and pages (310) the MS in those cells in which the loading level is between the short messaging threshold and a paging threshold. If (312) the RAN receives a short messaging response, logic flow 300 ends (320). Otherwise, if (314) the RAN receives a page response, the RAN sends (316) the short messaging to the MS in its cell (or, alternatively, assigns a traffic channel to the MS in order to transmit the short messaging) and the logic flow ends (320). If neither a page response nor a short messaging response is received, the RAN proceeds to either (318) transmit short messaging or page the MS in the cells with paging channel loading levels above the paging threshold. The logic flow then returns to block 312 (or 314, if the MS is paged).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to, specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language).

What is claimed is:

1. A method for signaling based on paging channel loading comprising:
   determining that an MS needs to be paged;
   determining a paging channel loading level for each of a plurality of cells in which the MS may be located;
   paging the MS only in those cells of the plurality of cells in which the paging channel loading level is below a paging threshold;
   when a page response is received from the MS in a cell, sending short messaging to the MS in the cell, wherein sending short messaging to the MS in the cell comprises sending the short messaging without at least one optional field of the short messaging when the paging channel loading level of the cell is above a short messaging threshold.

2. The method of claim 1, wherein the plurality of cells comprises cells in a paging zone of the MS.

3. The method of claim 1, wherein short messaging comprises messaging from the group consisting of data burst messaging (DBM), short message service (SMS) messaging, short data burst (SDB) messaging, a data packet, and notification messaging.

4. The method of claim 1, further comprising when a page response is received from the MS in a cell, sending channel assignment messaging to the MS in the cell to assign a traffic channel to the MS.

5. The method of claim 4, further comprising sending short messaging to the MS via the traffic channel.

6. The method of claim 1, further comprising paging the MS only in those cells of the plurality of cells in which the paging channel loading level is below a paging threshold after determining that the service triggering the page is delay tolerant.

7. The method of claim 6, wherein determining that the service triggering the page is delay tolerant comprises determining that the service is a voice call and the MS has a slot cycle index less than two.

8. The method of claim 1, further comprising when no page response is received from the MS after paging in only those cells of the plurality of cells in which the paging channel loading level is below a paging threshold, paging the MS in at least one of those cells of the plurality of cells in which the paging channel loading level is above the paging threshold.

9. The method of claim 1, further comprising when no page response is received from the MS after paging in only those cells of the plurality of cells in which the paging channel loading level is below a paging threshold, paging the MS in those cells of the plurality of cells in which the paging channel loading level is above the paging threshold.

10. A method for signaling based on paging channel loading comprising:
determining that short messaging needs to be sent to an MS;
determining a paging channel loading level for each of a plurality of cells in which the MS may be located;
transmitting the short messaging to the MS, via paging channel, only in those cells of the plurality of cells in which the paging channel loading level is below a short messaging threshold;
when no short messaging response is received from the MS after transmitting the short messaging to the MS only in those cells of the plurality of cells in which the paging channel loading level is below a short messaging threshold, transmitting the short messaging to the MS, via paging channel, in at least one of those cells of the plurality of cells in which the paging channel loading level is above the short messaging threshold.

11. The method of claim 10, wherein short messaging comprises messaging from the group consisting of data burst messaging (DBM), short message service (SMS) messaging, short data burst (SDB) messaging, a data packet, and notification messaging.

12. The method of claim 11, wherein notification messaging comprises messaging from the group consisting of email notification messaging, voice mail notification messaging, and presence notification messaging.

13. The method of claim 10, further comprising paging the MS only in those cells of the plurality of cells in which the paging channel loading level is above the short messaging threshold and below a paging threshold.

14. The method of claim 13, further comprising when a page response is received from the MS in a cell, sending the short messaging to the MS in the cell.

15. The method of claim 14, wherein the sending short messaging to the MS in the cell comprises sending the short messaging without at least one optional field of the short messaging when the paging channel loading level of the cell is above an overloaded threshold.

16. The method of claim 13, further comprising when a page response is received from the MS in a cell, sending channel assignment messaging to the MS in the cell to assign a traffic channel to the MS.

17. The method of claim 16, further comprising sending the short messaging to the MS via the traffic channel.

18. The method of claim 13, further comprising when no page response and no short messaging response are received from the MS, signaling the MS in at least one of those cells of the plurality of cells in which the paging channel loading level is above the paging threshold.

19. The method of claim 18, wherein signaling the MS comprises paging the MS.

20. The method of claim 18, wherein signaling the MS comprises transmitting the short messaging.

21. A radio access network (RAN) comprising:
wireless transceiver equipment adapted to support signaling transmission and reception for each cell of a plurality of cells;
a communications controller, communicatively coupled to the wireless transceiver equipment for each cell of the plurality of cells,
adapted to determine that an MS needs to be paged,
adapted to determine a paging channel loading level for each of the plurality of cells in which the MS may be located,
adapted to page the MS via the wireless transceiver equipment for only those cells of the plurality of cells in which the paging channel loading level is below a paging threshold;
adapted to send short messaging via the wireless transceiver to the MS in a cell when a page response is received from the MS in the cell, wherein the communications controller is adapted to send the short messaging without at least one optional field of the short messaging when the paging channel loading level of the cell is above a short messaging threshold.

22. The RAN of claim 21, wherein the communications controller is further adapted, when a page response is received from the MS in a cell, to send channel assignment messaging to the MS via the wireless transceiver equipment in the cell, to assign a traffic channel to the MS.

23. The RAN of claim 22, wherein the communications controller is further adapted to send short messaging to the MS via the wireless transceiver equipment and the traffic channel.

24. The RAN of claim 21, wherein the communications controller is further adapted, when no page response is received from the MS after paging in only in those cells of the plurality of cells in which the paging channel loading level is below a paging threshold, to page the MS via the wireless transceiver equipment in at least one of those cells of the plurality of cells in which the paging channel loading level is above the paging threshold.

25. A radio access network (RAN) comprising:
wireless transceiver equipment adapted to support signaling transmission and reception for each cell of a plurality of cells;
a communications controller, communicatively coupled to the wireless transceiver equipment for each cell of the plurality of cells,
  adapted to determine that short messaging needs to be sent to an MS,
  adapted to determine a paging channel loading level for each of the plurality of cells in which the MS may be located,
  adapted to transmit the short messaging to the MS via the wireless transceiver equipment and via paging channel for only those cells of the plurality of cells in which the paging channel loading level is below a short messaging threshold, and
  adapted to transmit the short messaging to the MS via the wireless transceiver equipment and via paging channel in at least one of those cells of the plurality of cells in which the paging channel loading level is above the short messaging threshold, when no short messaging response is received from the MS after transmitting the short messaging to the MS only in those cells of the plurality of cells in which the paging channel loading level is below a short messaging threshold.

26. The RAN of claim 25, wherein the communications controller is further adapted to page the MS via the wireless transceiver equipment only in those cells of the plurality of cells in which the paging channel loading level is above the short messaging threshold and below a paging threshold.

27. The RAN of claim 26, wherein the communications controller is further adapted, when a page response is received from the MS in a cell, to send the short messaging to the MS via the wireless transceiver equipment in the cell.

28. The RAN of claim 26, wherein the communications controller is further adapted, when a page response is received from the MS in a cell, to send channel assignment messaging to the MS via the wireless transceiver equipment in the cell, to assign a traffic channel to the MS.

29. The RAN of claim 28, wherein the communications controller is further adapted to send the short messaging to the MS via the wireless transceiver equipment and the traffic channel.

30. The RAN of claim 26, wherein the communications controller is further adapted, when no page response and no short messaging response are received from the MS, to send the MS via the wireless transceiver equipment in at least one of those cells of the plurality of cells in which the paging channel loading level is above the paging threshold.

* * * * *